United States Patent
Redman et al.

(10) Patent No.: US 9,148,990 B2
(45) Date of Patent: Oct. 6, 2015

(54) AGRICULTURAL IMPLEMENT PARTICULATE DISTRIBUTION SYSTEM

(71) Applicant: AGCO-AMITY JV, LLC, Fargo, ND (US)

(72) Inventors: Alan L. Redman, Wahpeton, ND (US); Timothy L. Karl, Harwood, ND (US); Lawrence F. Bernard, Wahpeton, ND (US); Matthew J. Meyer, West Fargo, ND (US)

(73) Assignee: AGCO-Amity JV, LLC, Fargo, ND (US)

( * ) Notice: Subject to any disclaimer, the term of this patent is extended or adjusted under 35 U.S.C. 154(b) by 132 days.

(21) Appl. No.: 13/838,135

(22) Filed: Mar. 15, 2013

(65) Prior Publication Data

US 2014/0261116 A1    Sep. 18, 2014

(51) Int. Cl.
| | |
|---|---|
| *A01C 7/04* | (2006.01) |
| *A01C 7/08* | (2006.01) |
| *A01C 7/20* | (2006.01) |
| *A01C 15/00* | (2006.01) |

(52) U.S. Cl.
CPC ............... *A01C 7/044* (2013.01); *A01C 7/081* (2013.01); *A01C 7/088* (2013.01); *A01C 7/20* (2013.01); *A01C 15/00* (2013.01)

(58) Field of Classification Search
CPC .......... A01C 7/044; A01C 7/042; A01C 7/04; A01C 7/00; A01C 7/081; A01C 7/08; A01C 7/088; A01C 7/20; A01C 15/00
USPC ............................................ 111/170, 11, 900
See application file for complete search history.

(56) References Cited

U.S. PATENT DOCUMENTS

| | | |
|---|---|---|
| 5,592,889 A | 1/1997 | Bourgault |
| 6,522,948 B1 | 2/2003 | Benneweis |
| 6,678,580 B2 | 1/2004 | Benneweis |
| 6,708,080 B2 | 3/2004 | Benneweis |
| 6,708,631 B1 | 3/2004 | McQuinn et al. |
| 6,877,675 B2 | 4/2005 | Benneweis |
| 7,555,990 B2 | 7/2009 | Beaujot |

(Continued)

FOREIGN PATENT DOCUMENTS

| | | |
|---|---|---|
| CA | 2539354 A1 | 3/2006 |
| CA | 2503174 A1 | 4/2006 |

(Continued)

OTHER PUBLICATIONS

International Search Report and Written Opinion dated May 19, 2014, for corresponding International Application No. PCT/US2014/024204, filed Mar. 12, 2014 (13 pages).

(Continued)

*Primary Examiner* — Christopher J Novosad
(74) *Attorney, Agent, or Firm* — Mai-Tram D. Lauer; Westman, Champlin & Koehler P.A.

(57) ABSTRACT

An exemplary agricultural implement includes a plurality of units configured to inject particulate material into a ground surface and a plurality of metering modules. Each metering module is configured to receive a supply of particulate material and to meter the particulate material to a set of the plurality of units. A distribution assembly is configured to receive particulate material from a source and to distribute the particulate material to the plurality of metering modules.

20 Claims, 16 Drawing Sheets

(56) References Cited

U.S. PATENT DOCUMENTS

| | | |
|---|---|---|
| 7,690,440 B2 | 4/2010 | Dean et al. |
| 8,141,504 B2 | 3/2012 | Dean et al. |
| 8,371,238 B2 | 2/2013 | Dean et al. |
| 2008/0163807 A1 | 7/2008 | Dean et al. |
| 2010/0122644 A1 | 5/2010 | Memory |
| 2011/0179984 A1 | 7/2011 | Beaujot et al. |
| 2012/0037057 A1 | 2/2012 | Beaujot |
| 2012/0103238 A1 | 5/2012 | Beaujot et al. |
| 2012/0132115 A1 | 5/2012 | Dean et al. |
| 2012/0211508 A1 | 8/2012 | Barsi et al. |
| 2012/0279430 A1 | 11/2012 | Beaujot |
| 2012/0301231 A1 | 11/2012 | Jagow et al. |

FOREIGN PATENT DOCUMENTS

| | | |
|---|---|---|
| CA | 2566248 A1 | 9/2007 |
| CA | 2607457 A1 | 10/2007 |
| CA | 2616239 A1 | 12/2007 |
| CA | 2664253 A1 | 4/2009 |
| CA | 2635401 A1 | 6/2009 |
| CA | 2729700 A1 | 1/2011 |
| CA | 2739149 A1 | 5/2011 |
| CA | 2737721 A1 | 10/2012 |
| EP | 2260688 A1 | 12/2010 |

OTHER PUBLICATIONS

"8000 Series Planters," White Planters, AGCO Corporation, 2011, 28 pages.

"Third Annual Master Seeders Conference," SeedMaster, Regina, Saskatchewan, Nov. 5, 2009, 6 pages.

"Cyclo Air Singulation Attachement for Concord Air Systems, Operations Manuel and Set-Up Instructions," Case Corporation, Jan. 1999, 114 pages.

"White Planter Introduces Versatile, Central Fill System Planters," White Planters 8500CFS News Release, AGCO Corporation, Nov. 2004, 3 pages.

"SeedMaster's New UltraPro Canola Meter," The Master Seeder—Your Precision Seeding Newsletter, vol. 6, Issue 1, Summer 2010, 6 pages.

"Cylco Air Meter," Case IH, Case Corporation, 1999, 4 pages.

"Sunflower 9000 Series," Sunflower, AFCO Corporation, 2011, 28 pages.

Declaration of Collin Miller, 2013, 10 pages.

"2055/2455/3255 Pneumatic Granular Applicator Operator's Manual," Valmar, Jun. 1999, 78 pages.

1702 — RECEIVE PARTICULATE MATERIAL FROM A SOURCE

1704 — DISTRIBUTE THE PARTICULATE MATERIAL TO A PLURALITY OF REMOTE LOCATIONS

1706 — METER THE DISTRIBUTED PARTICULATE MATERIAL AT EACH REMOTE LOCATION TO A PLURALITY OF SEEDING UNITS

1708 — INJECT THE PARTICULATE MATERIAL INTO A GROUND SURFACE

AGRICULTURAL IMPLEMENT PARTICULATE DISTRIBUTION SYSTEM

BACKGROUND

Agricultural implements for opening furrows in the ground and depositing seed therein are well known. One exemplary implement includes a frame mounted on wheels that is pulled behind a vehicle, such as a tractor. A plurality of ground-engaging openers are positioned along the frame for opening furrows as the implement moves along the ground. Particulate material, such as seed and/or fertilizer, are delivered from tanks or bins to the openers for placement in the furrows.

The discussion above is merely provided for general background information and is not intended to be used as an aid in determining the scope of the claimed subject matter. The claimed subject matter is not limited to implementations that solve any or all disadvantages noted in the background.

SUMMARY

In one exemplary embodiment, an agricultural implement includes a plurality of units configured to inject particulate material into a ground surface and a plurality of metering modules. Each metering module is configured to receive a supply of particulate material and to meter the particulate material to a set of the plurality of units. A distribution assembly is configured to receive particulate material from a source and to distribute the particulate material to the plurality of metering modules.

In one example, the particulate material comprises at least one of seed and fertilizer, and the plurality of units comprises a plurality of ground-engaging furrow openers.

In one example, each metering module of the plurality of metering modules comprises an enclosure configured to hold a quantity of particulate material. The plurality of enclosures are spaced apart along a frame of the agricultural implement.

In one example, the plurality of units extends along a width of the agricultural implement that is transverse to a direction of implement travel. Each unit of the plurality of units is spaced a distance from its associated metering module that is less than or equal to thirty percent of the width of the agricultural implement. For example, each unit of the plurality of units is disposed within 16 feet of the metering module that meters the particulate material to the unit.

In one example, particulate material is pneumatically delivered from each metering module to the set of units.

In one example, each metering module comprises a meter controllable independent of the other metering modules. For instance, each metering module can have a respective drive mechanism operably coupled to the meter. The meter can comprise a metering roller.

In one example, each metering module is configured to control a flow of particulate material to a different set of the units, each set comprising two or more of the units. Each metering module can be configured to prevent a flow of particulate material to individual units in the set of units.

In one example, the distribution assembly is configured to receive the particulate material from a tank or bin. In one example, the distribution assembly is configured to demand fill each of the plurality of metering modules. For instance, each of the metering modules can have an enclosure configured to hold a quantity of particulate material, and wherein particulate material flows to the enclosure as a function of space available in the enclosure. In one example, the particulate material is pneumatically delivered from the distribution assembly to each of the metering modules.

In one exemplary embodiment, a particulate material distribution assembly includes a plurality of metering modules, each module being configured to supply particulate material to a plurality of units, and a demand fill distribution assembly configured to receive particulate material from a supply source and to distribute the particulate material to the plurality of metering modules.

In one example, each of the metering modules comprises an enclosure configured to hold a quantity of particulate material. The particulate material flows to the enclosure as a function of space available in the enclosure.

In one example, the demand fill distribution assembly comprises a plurality of distribution lines, each line distributing particulate material to one of the metering modules.

In one example, the particulate material is pneumatically delivered from the distribution assembly to the metering modules.

In one example, the plurality of metering modules are spaced apart along a frame of an agricultural implement.

In one exemplary embodiment, a method of particulate material distribution includes distributing particulate material from a source to a plurality of remote locations and metering the particulate material from each remote location to a plurality of seeding units.

In one example, metering the particulate material includes controlling a meter at each of the plurality of remote locations.

In one example, distributing particulate material includes distributing the particulate material to a plurality of metering modules spaced apart along an agricultural implement.

In one example, metering includes, at each remote location, receiving a portion of particulate material distributed from the source and controlling distribution of the portion of particulate material to at least two seeding units.

In one example, distributing particulate material includes utilizing an air source to demand fill a metering module at each of the plurality of remote locations.

This summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure is referred to by like reference numerals throughout the several views.

FIG. 17 is a flow diagram illustrating a method of particulate material distribution, under one embodiment.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

The present disclosure generally relates to an agricultural implement, and more specifically, but not by limitation, to a distribution system for distributing particulate material to a plurality of seeding units configured to inject the particulate material into the ground. Examples of agricultural particulate material include, but are not limited to, seed, fertilizer, and inoculants.

The terms "seed" and "fertilizer" are used in describing various embodiments for illustration convenience; their use is not intended to limit the scope of the concepts described herein. For example, one skilled in the art understands that in at least some of the described embodiments "fertilizer" and/or other particulate materials may be used in addition, or in the alternative, to "seed." Further, some agricultural applications may apply only one particulate material (i.e., seed only, fertilizer only, etc.), while other applications may apply two or more different particulate materials (i.e., seed and fertilizer, etc.).

Figure 1:
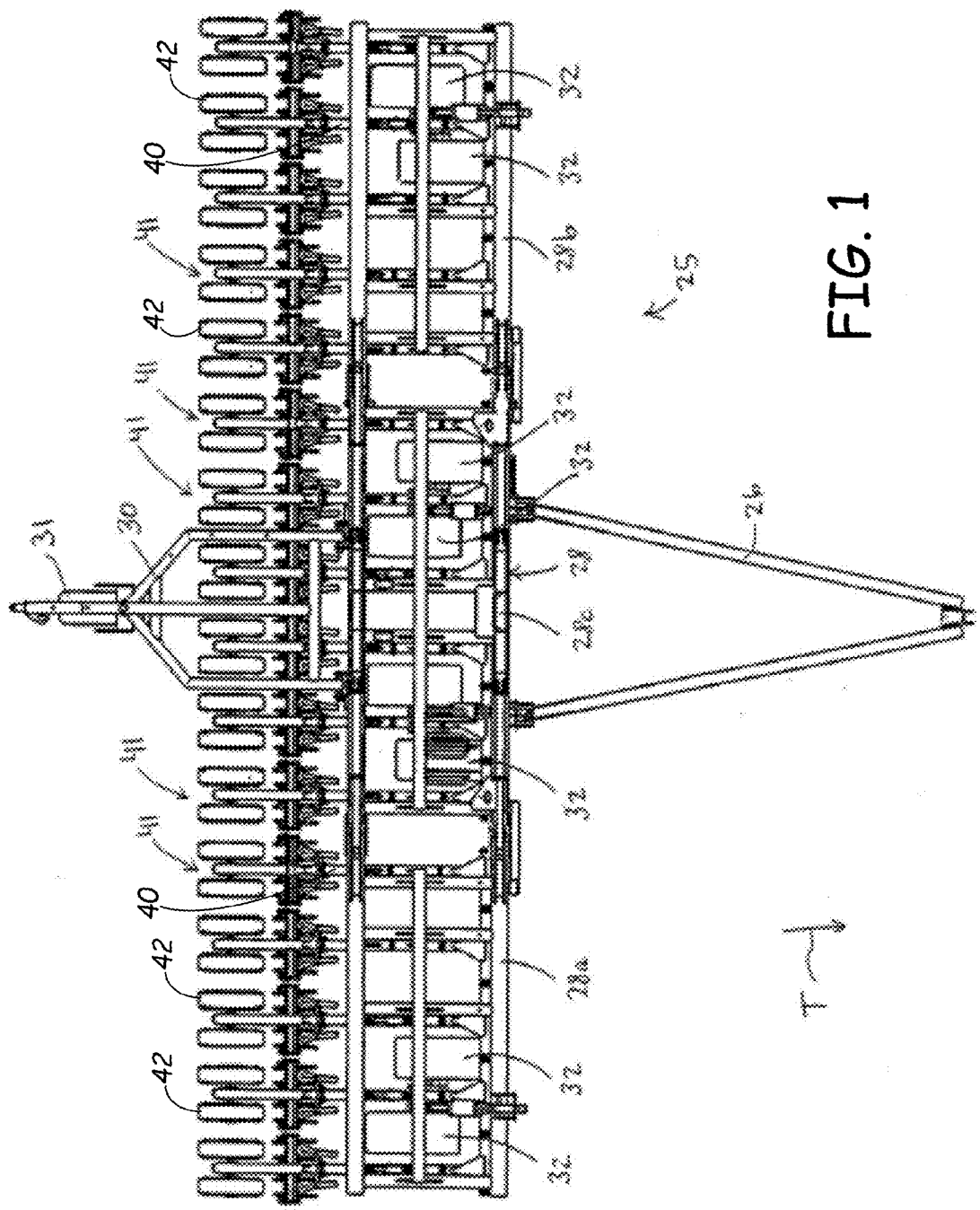
FIG. 1 is a top plan view of an exemplary agricultural implement.

FIG. 1 illustrates an agricultural implement 25 having a drawbar 26 for attachment to a vehicle (not shown) for pulling implement 25 across the ground (e.g., a tractor) in a direction of implement travel T. The drawbar 26 is connected to an implement frame 28, which may have one or more frame sections such as side folding frames sections 28a and 28b and central frame section 28c. A trailing drawbar 30 is attached to the frame 28, and provides a connection for pulling another unit (e.g., an air seeder) behind implement 25. As shown, the trailing drawbar 30 may have a support wheel 31. Frame 28 is supported on the ground by a plurality of support wheels 32.

A plurality of ground-engaging openings configured to create furrows for placement of particulate material are spaced along frame 28 in a direction that is transverse to the direction of implement travel T. In the illustrated embodiment, disc gang units 41 are connected to the frame 28 of the implement 25. Each gang unit 41 has a longitudinal bar 40 that is pivotally connected, adjacent its forward end, to the frame 28. The bar 40 is supported, adjacent its rearward end, by one or more seed packing wheels 42.

In one exemplary distribution system, particulate material (i.e., seed and/or fertilizer) is metered from a central metering location for a full width of the implement. In another exemplary system, particulate material is metered from a bulk tank pulled in front or behind of the implement. The particulate material is carried to the ground injection point through a series of hoses and manifolds. These systems require moving the particulate material a significantly long distance from the central metering unit at a high rate of speed, which can result in seed damage and/or inaccurate or non-uniform delivery. Seed damage can hinder germination and decrease yield per acre.

Figure 2:
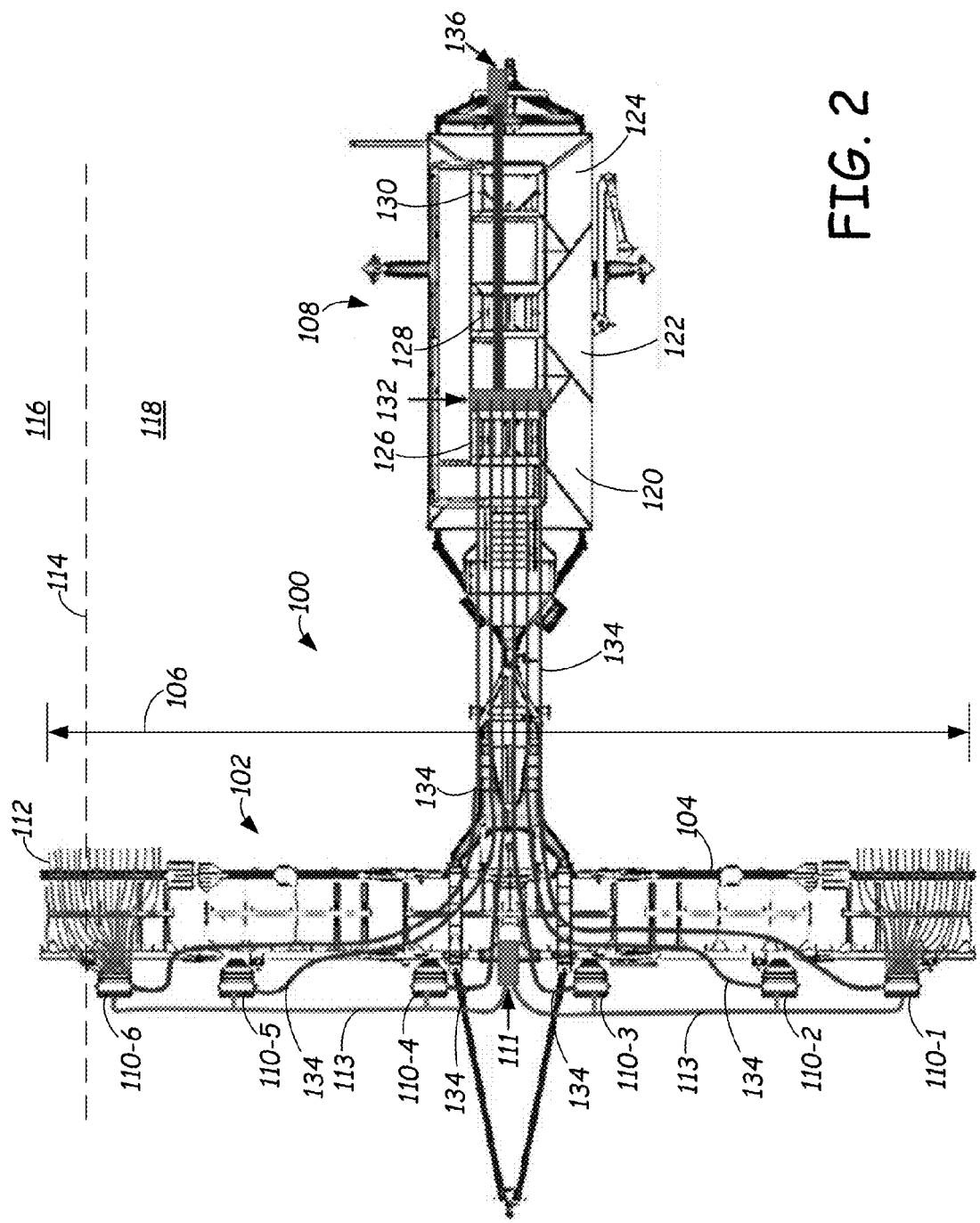
FIG. 2 is a schematic representation of an agricultural implement having a particulate distribution system, under one embodiment.

FIG. 2 is a schematic representation of a particulate distribution system 100 for use on an agricultural implement 102, under one embodiment. One example of an agricultural implement is illustrated in FIG. 1. Some features of agricultural implement 102 have been omitted for illustration convenience.

Implement 102 includes a frame 104 that supports a plurality of seeding units (not shown in FIG. 2). The seeding units comprise ground-engaging openers configured to create furrows in the ground and drop tubes for placement of particulate material in the furrows. In one example, a seeding unit comprises a seed flute configured for broadcast seeding.

The seeding units are distributed across a width 106 defining a seeding area that can be seeded during a single pass of implement 102. Width 106 comprises the distance between the outermost seeding units, and generally corresponds to a transverse length of frame 104. Examples of width 106 include, but are not limited to, 30, 40, 50, and 60 feet.

A particulate supply unit 108 is connected to and pulled behind implement 102. Unit 108 includes one or more tanks or bins for holding particulate material to be delivered to the seeding units.

Distribution system 100 includes a plurality of metering modules spaced apart along implement 102. In one example, at least two metering modules are used. In the illustrated embodiment, system 100 includes six metering modules 110-1, 110-2, 110-3, 110-4, 110-5, and 110-6, which are also referred to herein either collectively or individually as metering module(s) 110. Of course, more than or less than six metering modules can be used.

Each metering module 110 meters particulate material to at least one of the seeding units. In the illustrated embodiment, each metering module 110 meters particulate material to a plurality of the seeding units via lines 112. By way of example, but not limitation, in the embodiment illustrated in FIG. 2 implement 102 has 96 seeding units. Each module 110 meters particulate material to a different set of 16 seeding units. However, the number of metering modules 110 and seeding units can be selected based on, for example, the width 106 of implement 102 and desired spacing between furrows. The lines from metering modules 110-2, 110-3, 110-4, and 110-5 to their respective seeding units are not shown in FIG. 2 for illustration convenience.

System 100 illustratively places the metering functions closer to the ground injection points which can provide more gentler and precise delivery of the particulate material. In one embodiment, but not by limitation, each seeding unit across implement 102 is positioned a distance from its respective metering module 110 that is within thirty percent of width 106. In one embodiment, each seeding unit across implement 102 is positioned a distance from its respective metering module 110 that is within twenty five percent of width 106. In one embodiment, each seeding unit across implement 102 is positioned a distance from its respective metering module 110 that is within twenty percent of width 106. In one particular example, each seeding unit of the plurality of seeding units spaced along width 106 is positioned at or within approximately 16 feet of its respective metering module 110. In another example, each seeding unit is positioned at or within approximately 12 feet of its respective metering module 110. In another example, each seeding unit is positioned at or within approximately 10 feet of its respective metering module 110. In another example, each seeding unit is positioned at or within approximately 8 feet of its respective metering module 110. It is noted that these are examples and are not intended to limit the scope of the concepts described herein.

Each metering module 110 is configured to control a flow rate of particulate material to its respective seeding units. The flow rate can be controlled, for example, based on a desired application quantity per acre and a speed of travel of the implement across the ground.

In one example, gravity drop meters can be utilized in modules 110 for metering the particulate material to the seeding units. In the illustrated embodiment, the particulate material is delivered pneumatically from modules 110 to the ground injection points at the seeding units. For example, one or more blowers 111 are provided on implement 102 providing airflow to modules 110 via tubes 113.

In accordance with one embodiment, each metering module 110 is configured to stop the flow of particulate material to one or more of the seeding units. For example, each metering module 110 can be configured to stop the flow of particulate material to individual ones, or all, of the seeding units being metered by the module 110. In this manner, a zone or sectional control scheme can be implemented to stop a portion of the seeding units across implement 102 to prevent application of seed to areas of ground where seeding is not desired and/or to prevent double application (i.e., seeding an area of ground that has already been seeded). By way of example, but not limitation, line 114 in FIG. 2 generally illustrates a boundary between a previously seeded area 116 and an area 118 to be seeded during a current pass of implement 102. Module 110-6 is controlled to stop the flow of particulate material to the seeding units that are positioned within area 116.

Particulate supply unit 108 illustratively includes a plurality of tanks 120, 122, and 124 each configured to hold a particulate material to be delivered to the seeding units. Of course, less than or more than three tanks can be used. Each tank 120, 122, and 124 has an opening 126, 128, and 130, respectively, in a bottom portion thereof.

The particulate material can be provided from unit 108 to implement 102 using any suitable distribution mechanism. For example, a mechanical mechanism such as an auger can be utilized. In another example, unit 108 comprises an air seeder that delivers the particulate material to implement 102 pneumatically.

In the illustrated embodiment, a distribution assembly 132 is configured to receive particulate material from tank 120 and pneumatically distribute the particulate material to the metering modules 110 via distribution tubes 134. In the illustrated example, a plurality of tubes 134 are provided with each one of the tubes 134 supplying one of the metering modules 110. A blower 136 is configured to provided a flow of air to distribution assembly 132 to assist the flow of particulate material through tubes 134. It is noted that in other examples, additional distribution assemblies 132 can be provided for tanks 122 and/or 124 for providing particulate material from those tanks to modules 110.

Figure 3:
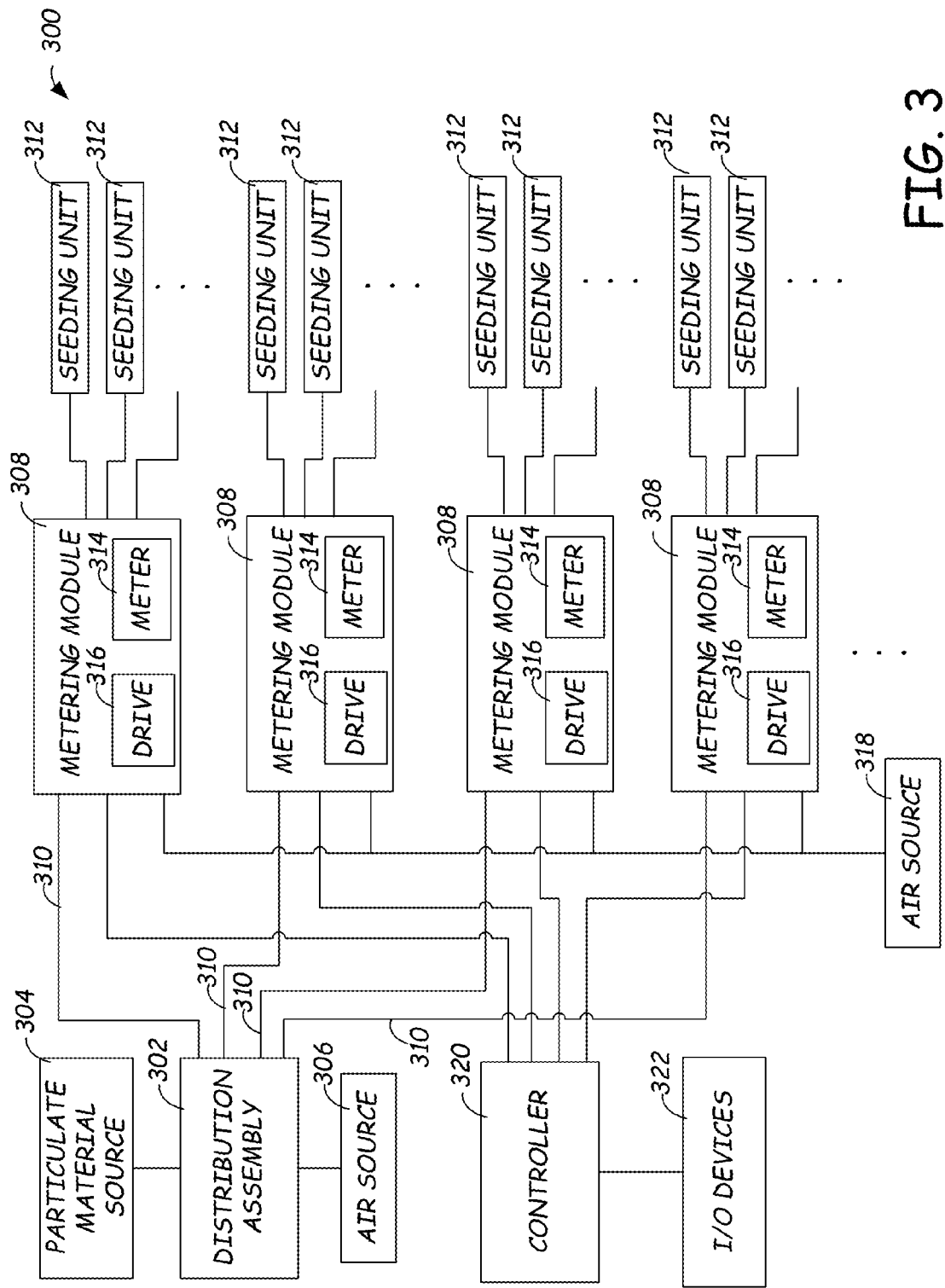
FIG. 3 is a schematic representation of a particulate distribution system, under one embodiment.

FIG. 3 is a schematic representation of a particulate distribution system 300, under one embodiment. As shown, a distribution assembly 302 receives particulate material from a source 304 and, using an air source 306, provides the particulate material to metering modules 308 through distribution tubes 310. Each metering module 308 meters the particulate material to a respective set of seeding units 312. The ellipses in FIG. 3 represent that additional metering modules and seeding units can be present in system 300.

Each metering module includes a meter 314 and a meter drive 316. Meters 314 can be driven using any suitable driving mechanism. For example, meters 314 can comprise metering rollers that are turned by an electric, hydraulic, and/or pneumatic drive. In one example, a ground-engaging wheel can be used to turn a metering roller.

Each metering module 308 includes a drive 316 that can be controlled individually, for example using a controller 320. This allows the flow through a particular one of the metering modules 308 to be controlled independent of other ones of the metering modules 308. Input/output devices 322 can be provided, for example in a cab of a tractor, to allow a user to interface with the distribution system 300. The user can, for example, adjust particulate application rates or stop selected seeding units 312. An air source 318 provides a flow of air to metering modules 308 for pneumatically delivering the material to seeding units 312.

In one embodiment, controller 320 can be configured to control operation of air sources 306 and 318. For example, controller 320 can turn on/off air sources 306 and/or 318 and adjust a flow rate of the air.

In one embodiment, controller 320 can be configured to control a gate or other suitable mechanism at particulate material source 304 that controls a flow of material from source 304. For example, controller 320 can be used to stop material flow into distribution assembly 302.

Figure 4:
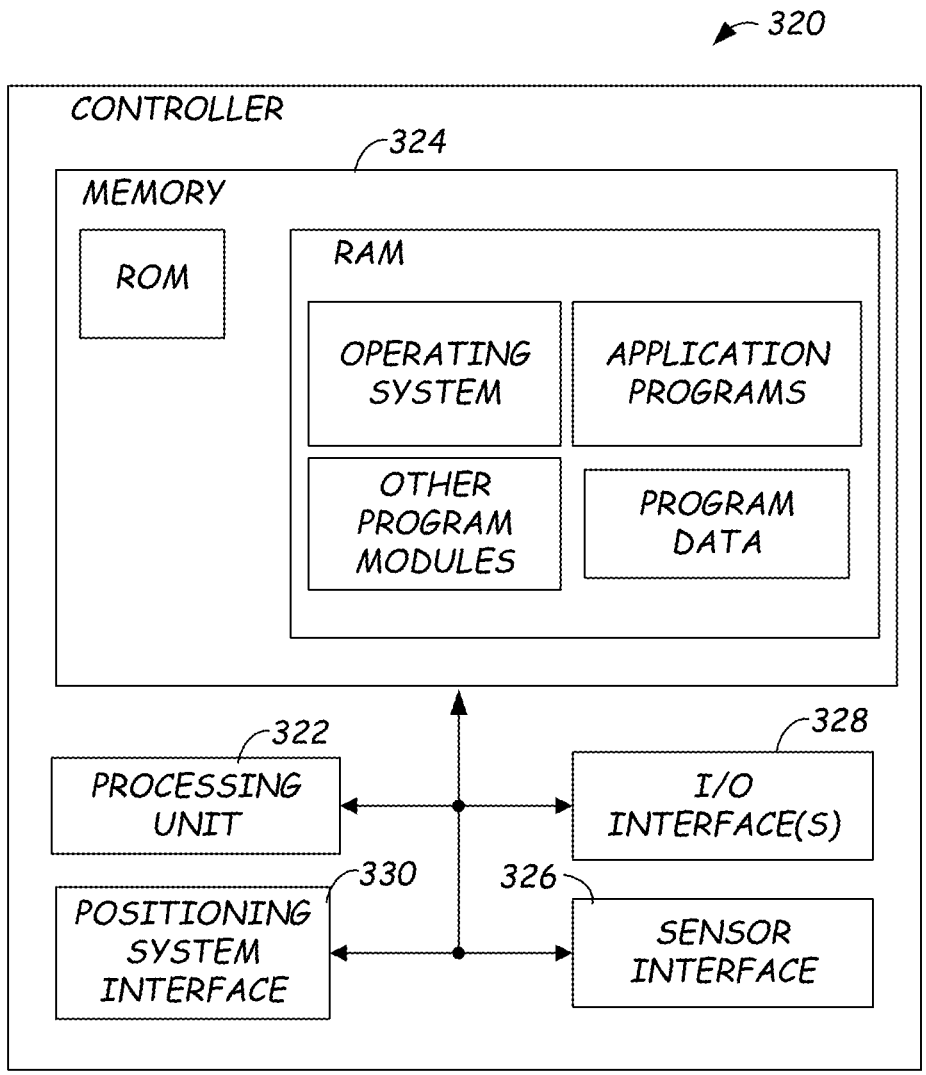
FIG. 4 is a schematic representation of a controller for a particulate distribution system, under one embodiment.

FIG. 4 illustrates one embodiment of controller 320. Controller 320 can include a processing unit 322 and memory 324 that is coupled to the processing unit 322. In the illustrated example, processing unit 322 is a computer processor with associated memory and timing circuitry (not separately shown) that is a functional part of the system and is activated by, and facilitates functionality of other parts or components of the system. Memory 324 can include computer storage media such as read only memory and random access memory. A number of program modules may be stored, such as application programs that can include instructions for controller 320.

A sensor interface 326 can be configured to receive feedback from sensors on the implement, such as a speed sensor that indicates a speed of travel of the implement. I/O interfaces 328 can be configured to receive signals from input devices that are operated by the user and provide signals to output devices, such as a display screen. A positioning system interface 330 can also be provided to receive positioning information indicating a spatial location of the implement. For example, a global positioning system (GPS) can be utilized to track a location of the implement. The location information can be used by controller 320 to automatically control metering modules 308. For example, the controller 320 can determine that an area over which the implement is traveling (e.g., area 116 in FIG. 2) has already been seeded and automatically stop particulate material flow to the seeding units in that area. In another example, other inputs such as, but not limited to, status information from material gates, air sources, etc., can be received at controller 320.

Figure 5:
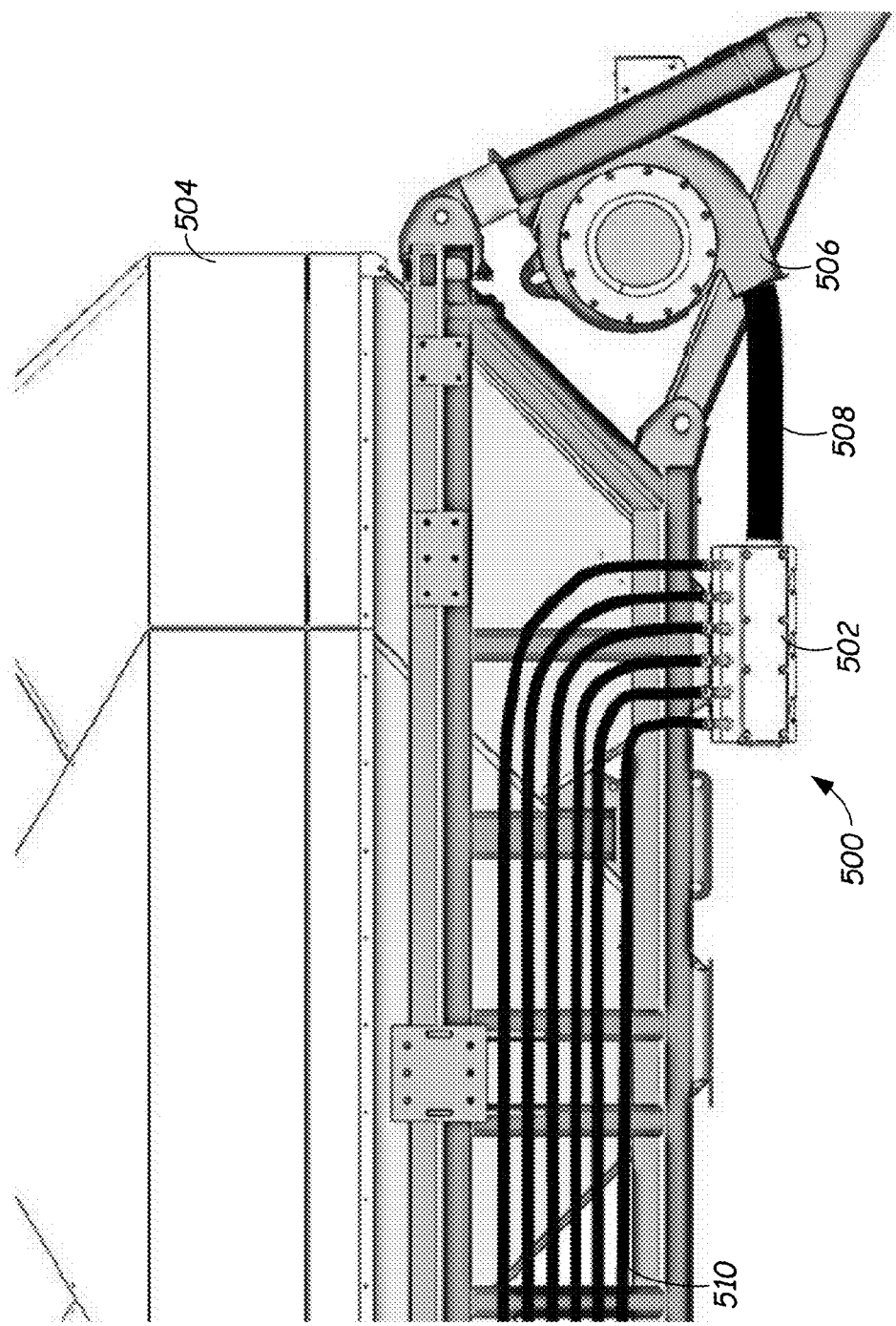
FIG. 5 is a side elevation view of a distribution assembly, under one embodiment.

FIG. 5 illustrates one embodiment of a distribution assembly 500 that is configured to receive particulate material from a source and to provide respective supplies of the particulate material to a plurality of metering modules. Assembly 500 includes a distribution chamber 502 that is positioned below and configured to receive particulate material from a tank 504. A blower 506 provides a source of air via a tube 508 to the distribution chamber 502. A plurality of distribution tubes 510 are routed under the tanks to a plurality of metering modules. Distribution assembly 500 is illustratively configured to provide a demand based flow of particulate material to each metering module. In this manner, the particulate material flows in tubes 510 as there is room in the metering modules. Thus, the flow of material in a tube 510 to a metering module may stop if the metering module is not dispersing material. In one example, the demand flow distribution assembly 500 does not require metering components.

Figure 6:
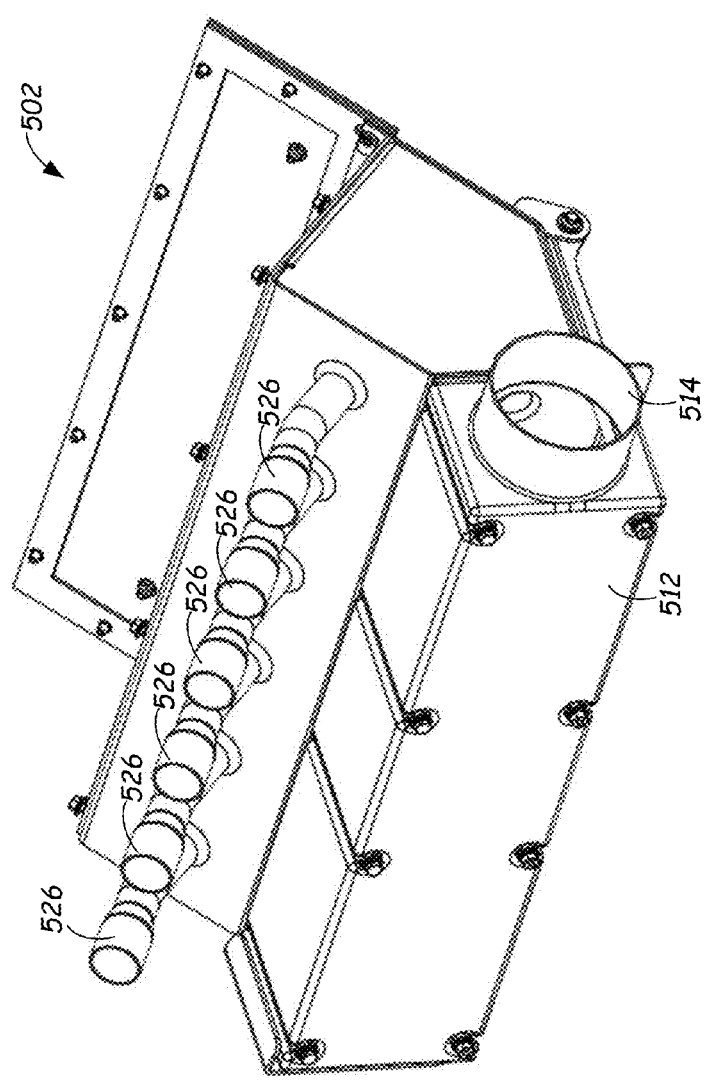
FIG. 6 is a perspective view of a distribution chamber, under one embodiment.
Figure 7:
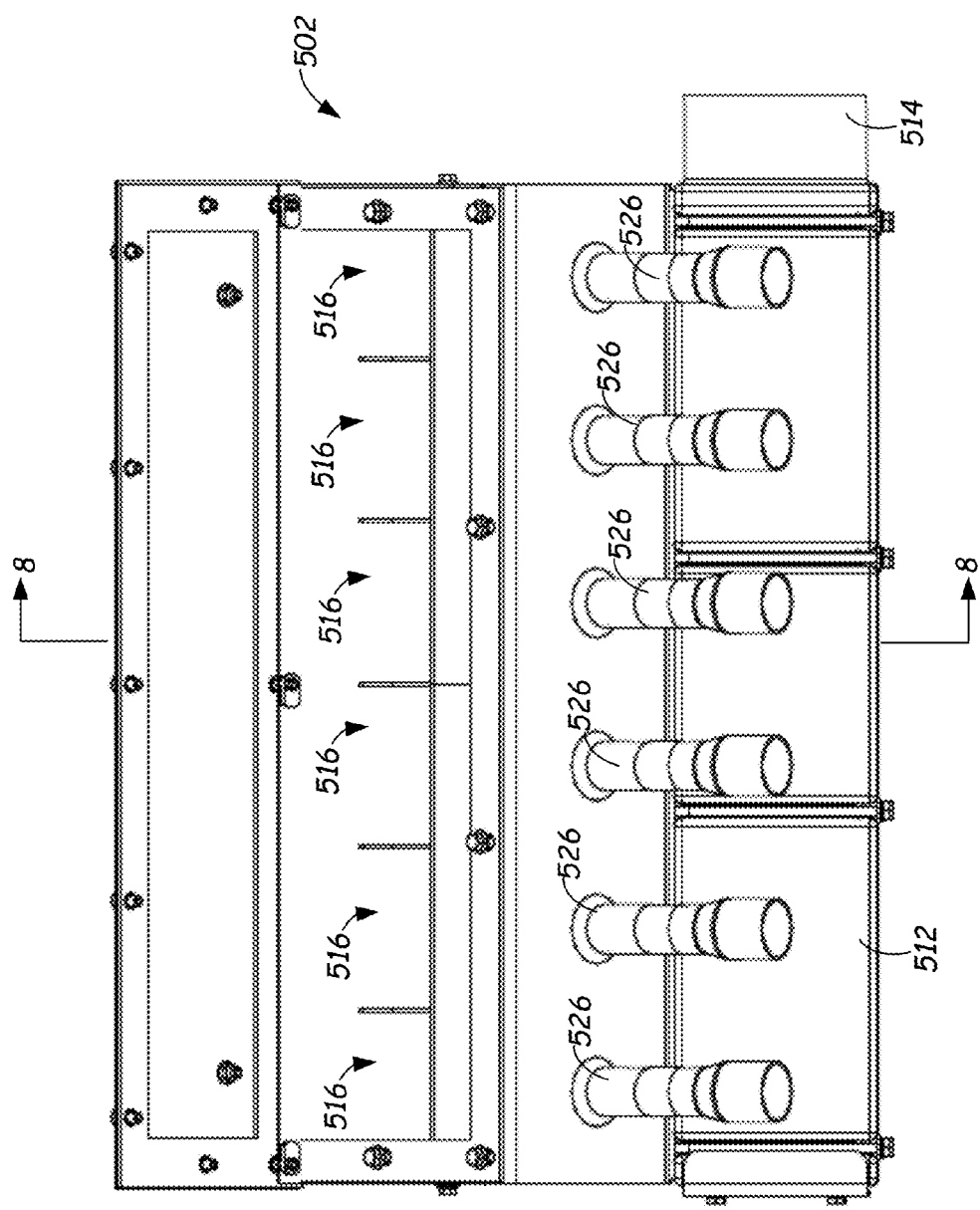
FIG. 7 is a top plan view of the distribution chamber of FIG. 6.
Figure 8:
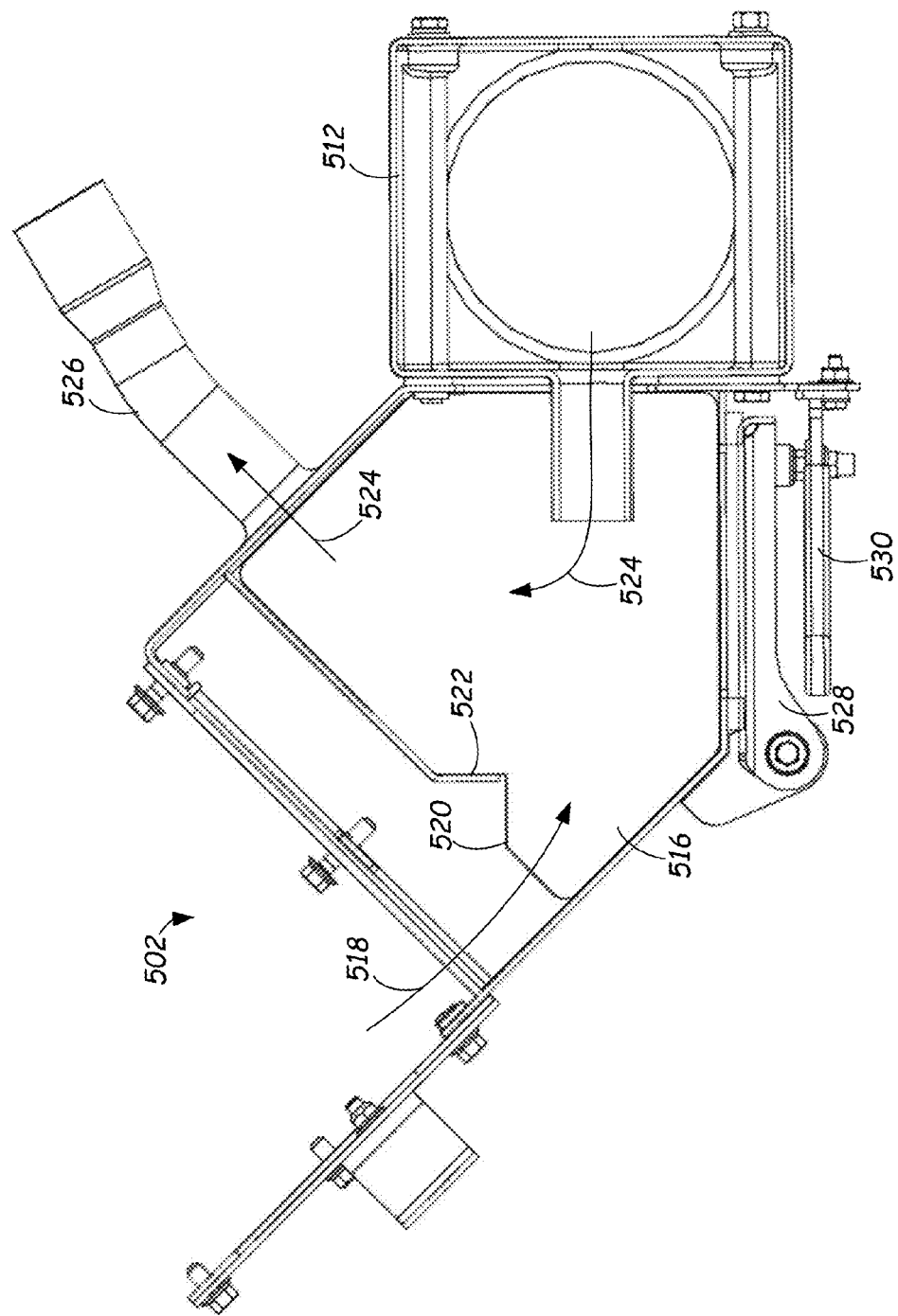
FIG. 8 is a side sectional view of the distribution chamber of FIG. 7 at line 8-8.
Figure 9:
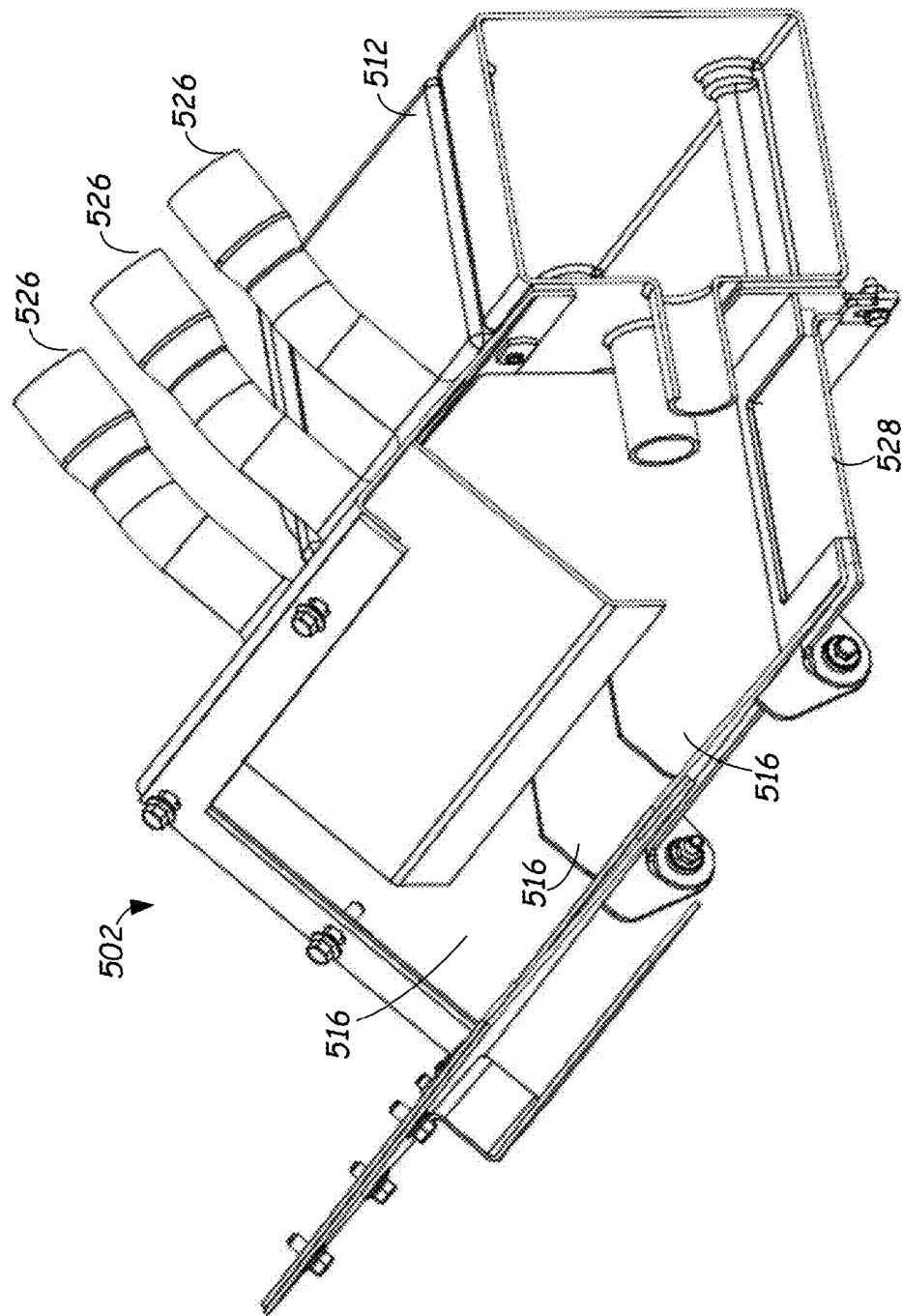
FIG. 9 is a perspective sectional view of the distribution chamber of FIG. 7 at line 8-8.

FIGS. 6-9 illustrate distribution chamber 502 in further detail. FIGS. 6 and 7 are perspective and top views, respectively, of distribution chamber 502. FIGS. 8 and 9 are side and perspective sectional views, respectively, of distribution chamber 502 taken at line 8-8 in FIG. 7.

Distribution chamber 502 includes an air box 512 having an opening 514 that receives air flow from blower 506. A plurality of partitioned compartments 516 receive the particulate material from tank 504. As shown in FIG. 8, the particulate material flows into a compartment 516 (as illustrated by arrow 518) through an opening 520. A downwardly extending wall 522 operates to limit the flow of seed into compartment 516.

Air flows from air box 512 through compartment 516 (as illustrated by arrows 524). This air flow picks up particulate material in chamber 516, which then flows through an output port 526 which is connected to one of the distribution tubes 510.

A hinged door 528 (shown in FIGS. 8 and 9) forms a bottom of the compartments 516 and enables the compartments 516 to be opened, for example to empty the particulate material from the compartments. Door 528 is opened using a latch 530.

Figure 10:
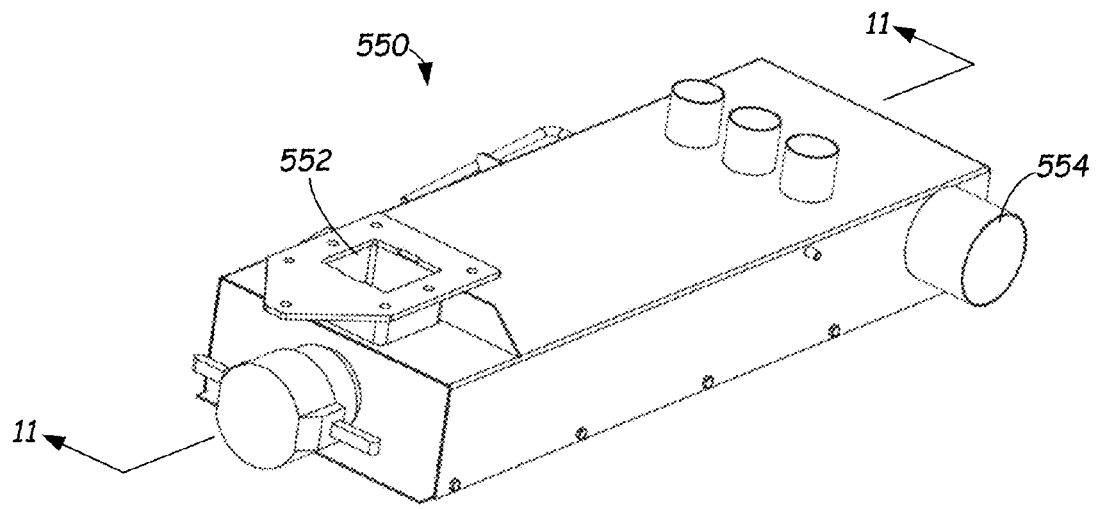
FIG. 10 is a perspective view of a distribution chamber, under one embodiment.
Figure 11:
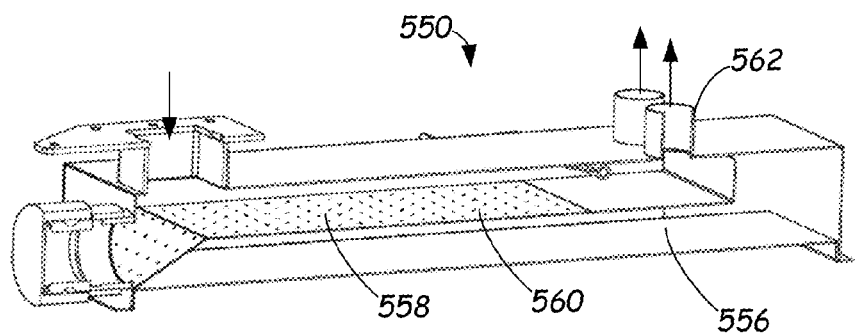
FIG. 11 is a perspective sectional view of the distribution chamber of FIG. 10 at line 11-11.

FIGS. 10 and 11 illustrate another embodiment of a distribution chamber 550. FIG. 11 illustrates chamber 550 with a cross-section taken at line 11-11 shown in FIG. 10. Chamber 550 includes an opening 552 that receives particulate material from a tank and an opening 554 that receives air from an air source. The air flows into a first chamber 556 and through a perforated plate 558 into a second chamber 560. The air carries particulate material from chamber 560 through output ports 562.

Figure 12:
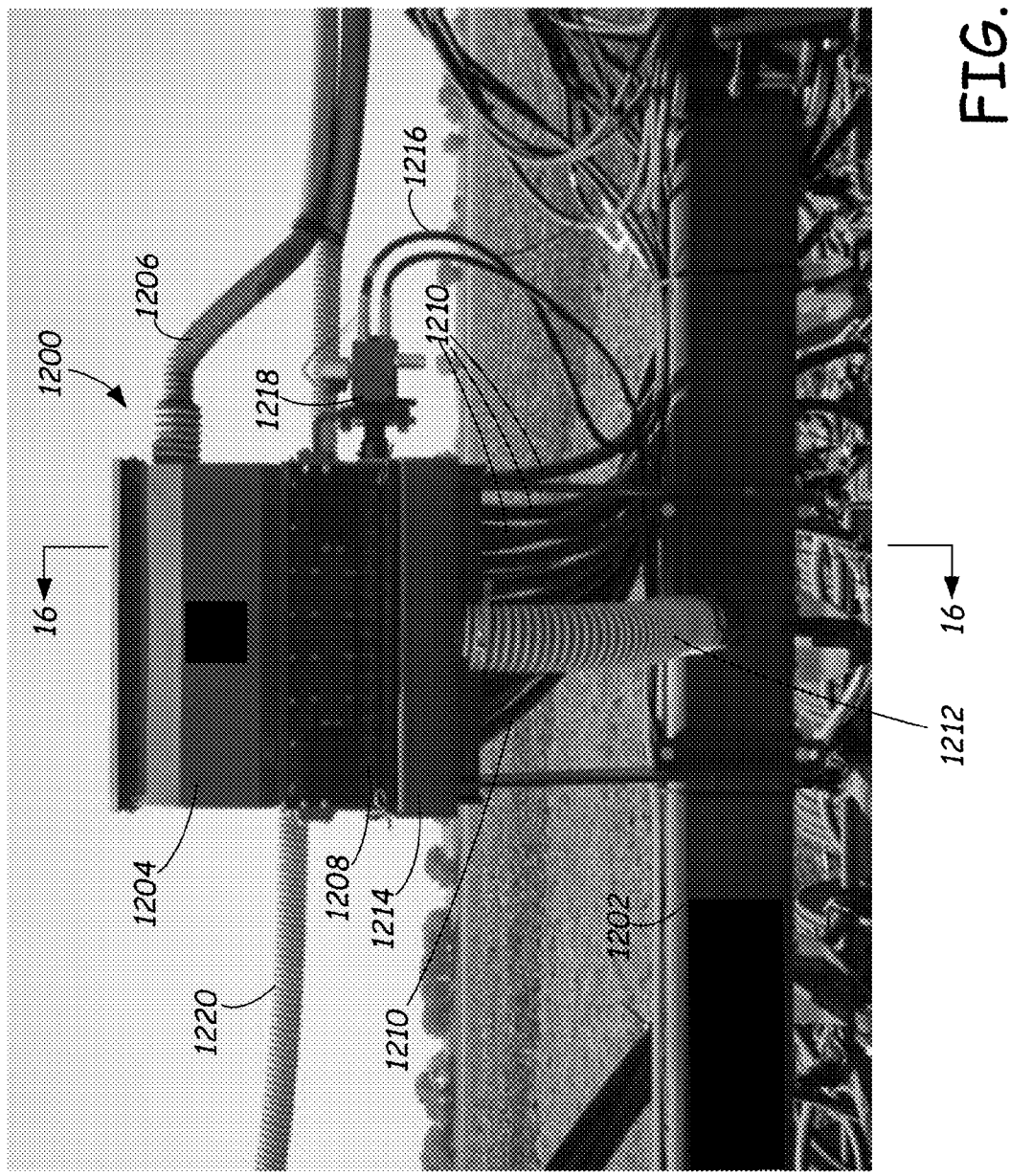
FIG. 12 is a side elevation view of a metering module, under one embodiment.

FIG. 12 illustrates one embodiment of a metering module 1200. Metering module 1200 is mounted on an implement frame 1202 and has an enclosure 1204 that receives and holds a quantity of particulate material pneumatically delivered via a demand fill line 1206. Line 1206 is provided from a distribution assembly, such as assembly 500 illustrated in FIG. 5. The particulate material flows through tube 1206 as space is available in enclosure 1204 as a result of the particulate material being metered through module 1200.

In the illustrated embodiment, module 1200 includes a metering roller 1208 that meters the particulate material into a plurality of lines 1210. Each line 1210 runs to a seeding unit. An air flow tube 1212 provides a source of air for module 1200 which is used for pneumatically delivering the particulate material through lines 1210. In one embodiment, a centrally located fan or blower, such as fan 111 illustrated in FIG. 2, is provided on the implement. In one embodiment, an air flow path is formed from a blower, such as fan 111, to module 1200 through frame 1202 and tube 1212 into an air box 1214.

In the illustrated embodiment, metering roller 1208 is driven hydraulically, using hydraulic supply lines 1216. In other embodiments, roller 1208 can be driven pneumatically or by an electric motor. A valve 1218 is modulated between a fully open position and a closed position to control the speed, and thus output, of metering roller 1208. FIG. 12 also illustrates a second demand fill tube 1220 running to another metering module (not shown in FIG. 12). Tube 1220 bypasses module 1200 and provides a supply of particulate material to the other metering module.

Module 1200 is configured to receive and meter seed to a plurality of seeding units. Alternatively, or in addition, fertilizer can be supplied to the seeding units. Module 1200 can be configured to receive a first supply of seed and a second supply of fertilizer. In one example, module 1200 can include multiple metering rollers that each meter one of the seed and the fertilizer.

In another example, a second metering module receiving a supply of fertilizer can be provided on frame 1202. For instance, a line from the seed metering module can be joined to a line from the fertilizer metering module to deliver a seed/fertilizer mixture to a seeding unit.

Figure 13:
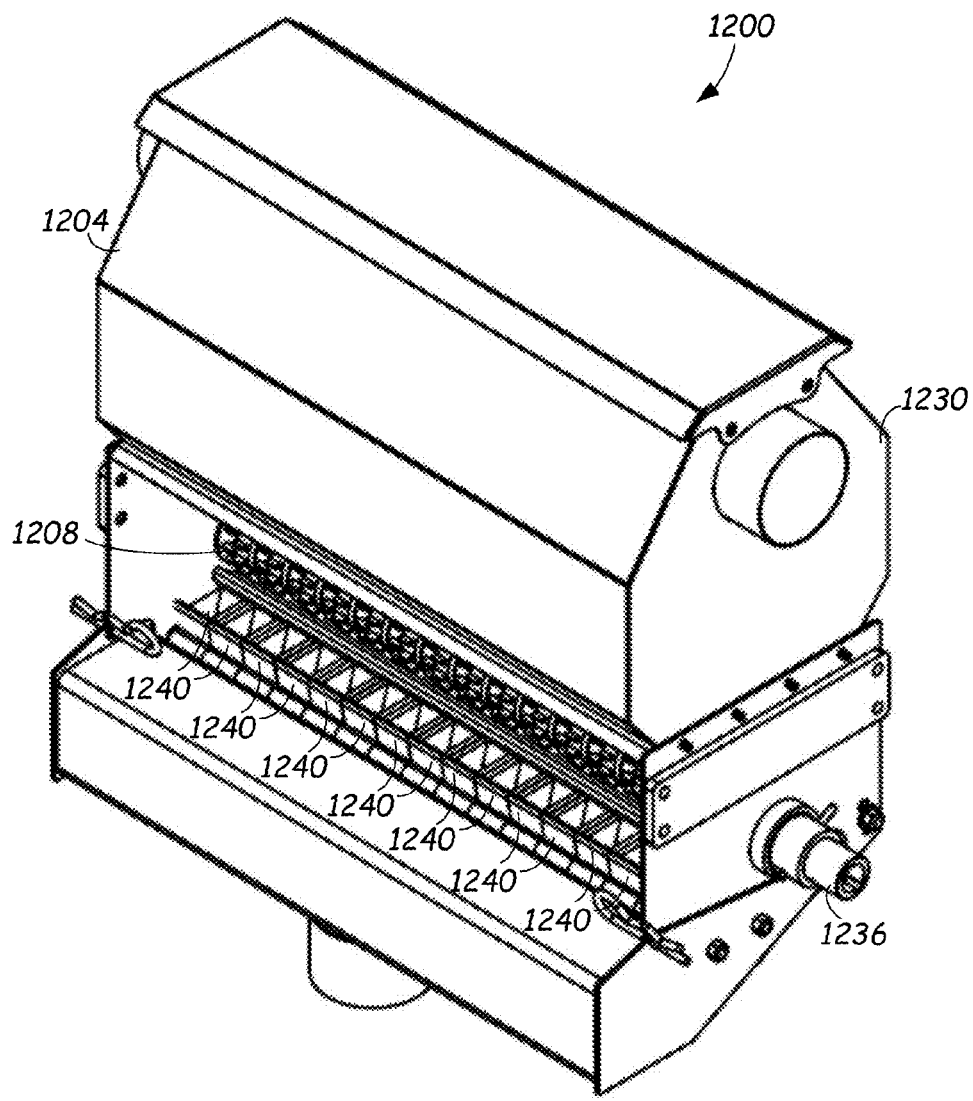
FIG. 13 is a front perspective view of the metering module of FIG. 12.
Figure 14:
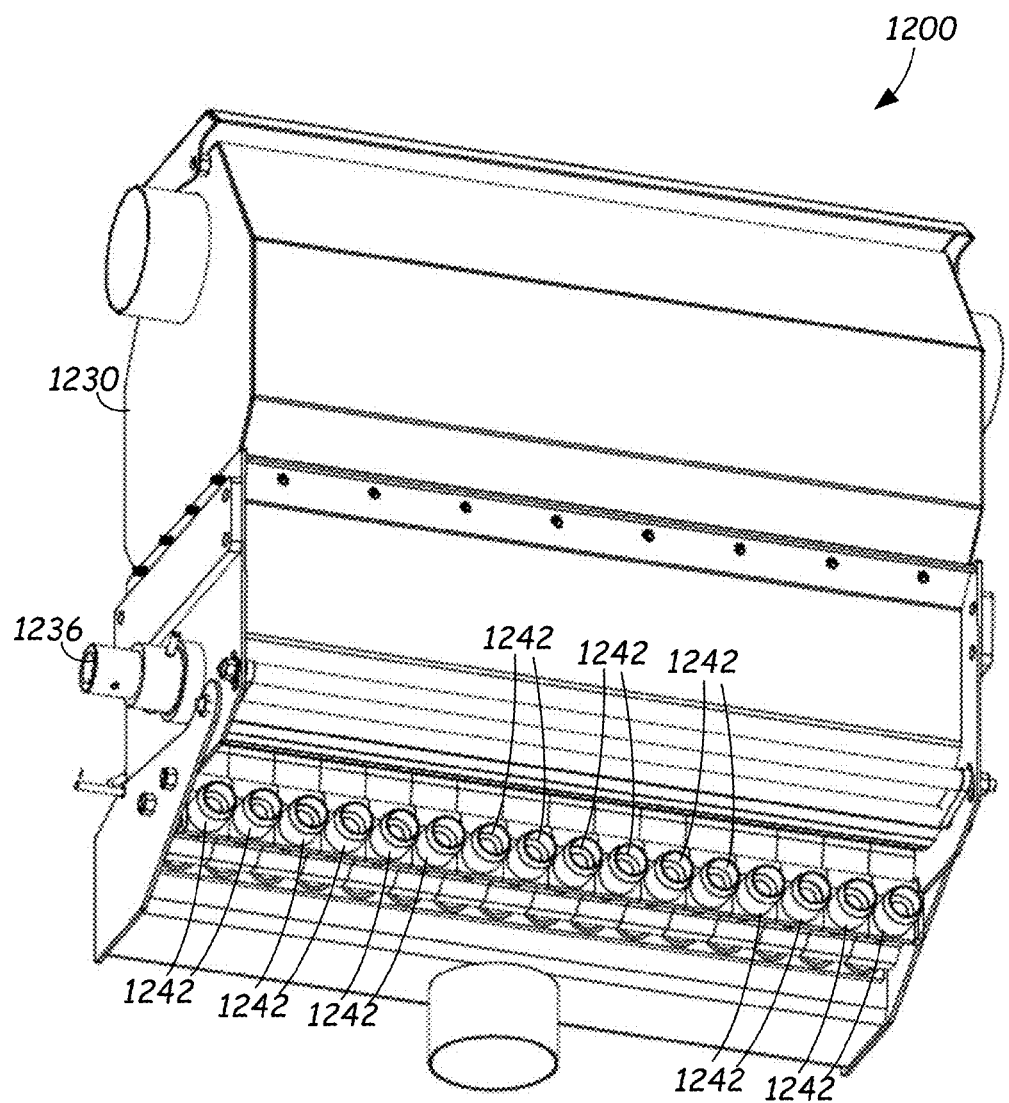
FIG. 14 is a rear perspective view of the metering module of FIG. 12.
Figure 15:
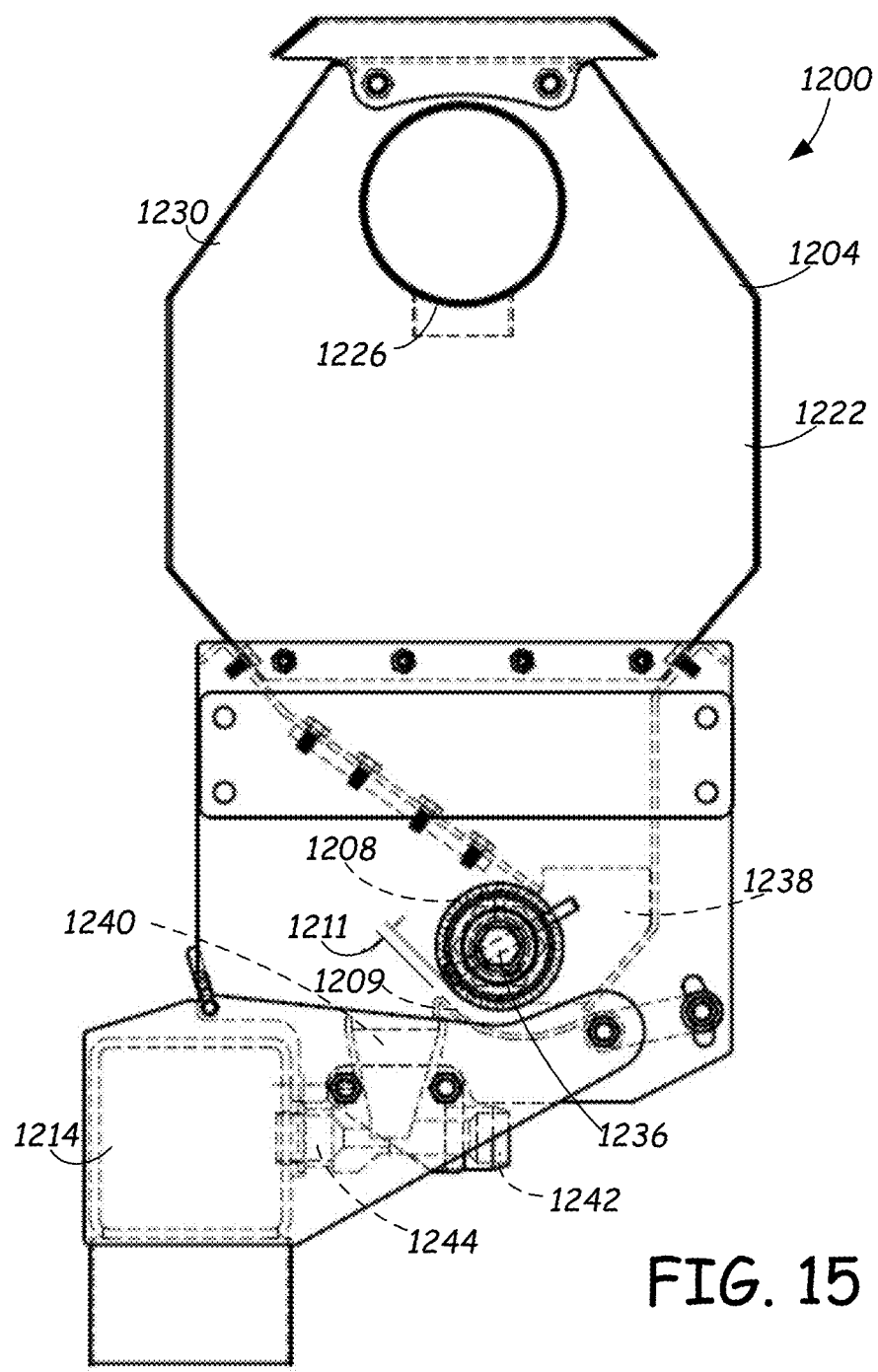
FIG. 15 is a side elevation view of the metering module of FIG. 12 with some internal components illustrated in phantom.
Figure 16:
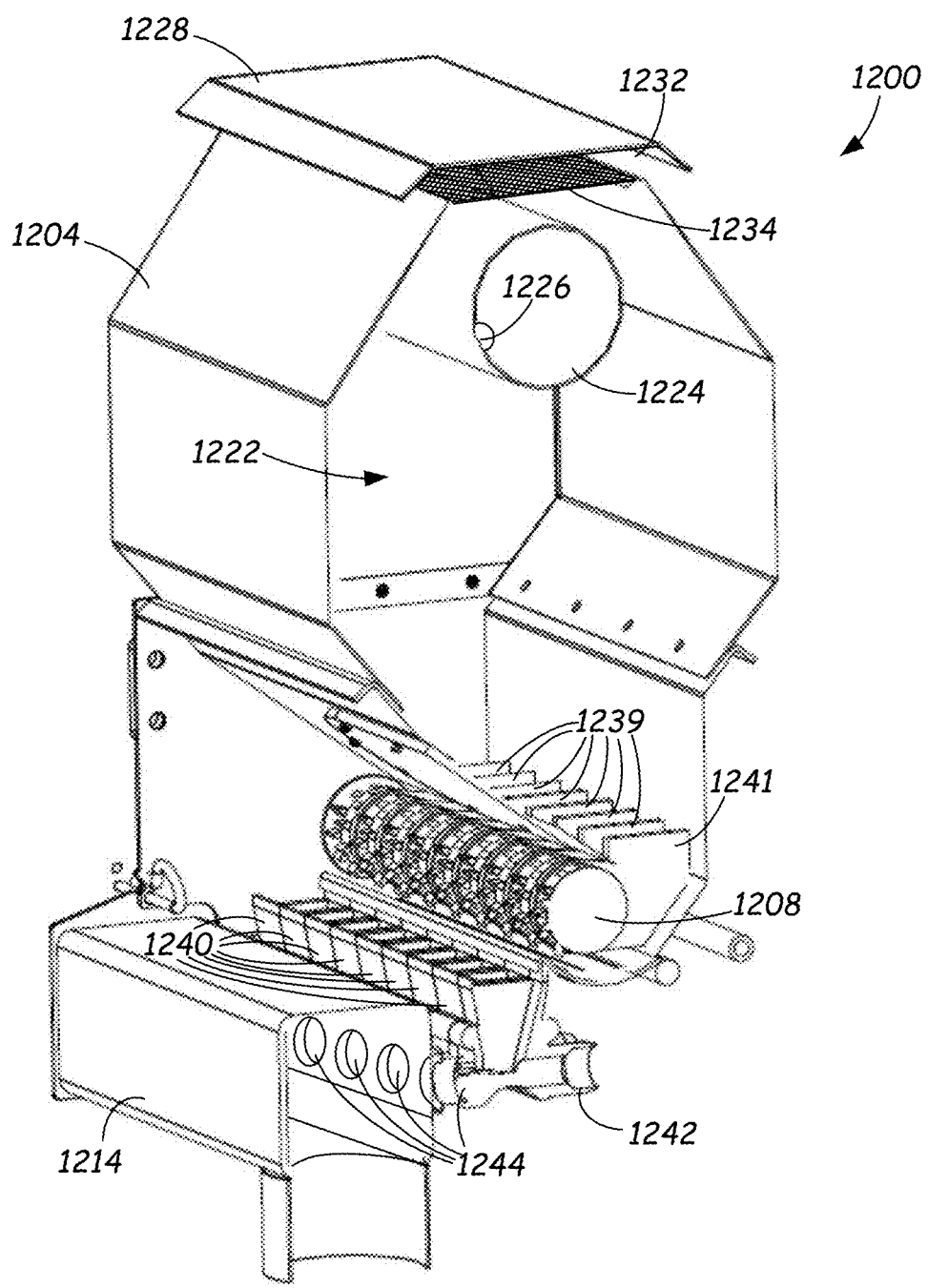
FIG. 16 is a perspective sectional view of the metering module of FIG. 12 at line 16-16.

FIGS. 13-16 illustrate module 1200 in further detail. FIGS. 13 and 14 are perspective views of module 1200. FIG. 15 is a side view illustrating some internal components of module 1200 in phantom. FIG. 16 is a side perspective view with a cross-section taken at line 16-16 shown in FIG. 12.

In the illustrated embodiment, housing 1204 has an internal compartment 1222 configured to hold a quantity of particulate material delivered through a tube 1224 having an opening 1226 formed in a bottom thereof. Opening 1226 allows the particulate material to flow from the demand fill tube 1206 into compartment 1222. In the illustrated embodiment, module 1200 has a top cover plate 1228 that is mounted to sidewalls 1230. A gap 1232 is formed between cover plate 1228 and enclosure 1204 allowing air to escape the enclosure 1204. In one example, a filter 1234, such as a mesh screen, is provided between compartment 1222 and gap 1232 to prevent the particulate material from escaping module 1200.

By way of example, as space is available in enclosure 1222 the particulate material flows from tube 1224 through opening 1226. When compartment 1222 is full and cannot accept any more material, some quantity of air may continue to flow into compartment 1222 and exit module 1200 through gap 1232.

Module 1200 includes a metering roller 1208 that is driven by a shaft 1236. Metering roller 1208 is spaced from an opposing plate 1209 forming a gap 1211. Roller 1208 meters the particulate material from a lower portion 1238 of compartment 1222 into a plurality of venturi cups 1240. The rotational speed of roller 1208 is increased or decreased to adjust the flow rate of the particulate material into the venturi cups 1240. For example, rotation of roller 1208 can be stopped to prevent particulate material from being delivered to the seeding units.

Each venturi cup 1240 is connected to an output port 1242. Each output port 1242 receives a tube 1210 (FIG. 12) for providing the particulate material to a seeding unit. Air from tube 1220 enters a hollow air box 1214 and into one of a plurality of venturi tubes 1244, which carries the particulate material through output ports 1242.

In the illustrated embodiment, the lower section 1238 can be divided into a plurality of partitions 1239 by walls 1241. Each partition 1239 is aligned with one of the venturi cups 1240. In one example, one or more actuatable gates (not shown) can be utilized to block one or more of the partitions 1239, thereby stopping the flow of particulate material past a portion of roller 1208. In this manner, a gate can prevent particulate material from being delivered to individual ones of the seeding units that are coupled to module 1200.

FIG. 17 is a flow diagram illustrating a method 1700 of particulate material distribution, under one embodiment. For purposes of illustration, but not by limitation, method 1700 will be discussed in the context of distribution system 100 illustrated in FIG. 2. It is understood that the other distribution systems and features of such systems disclosed herein may be employed in the performance of a method of particulate material distribution.

At step 1702, particulate material is received from a source and, at step 1704, the material is distributed to a plurality of remote locations. For example, distribution assembly 132 receives the material from tank 120 and, using air source 136, performs pneumatic demand fill distribution to a plurality of metering modules 110.

At step 1706, the material received at each remote location is metered to a plurality of seeding units. For example, each metering module 110 receives a portion of particulate material through a tube 134 and controls distribution of the portion of particulate material to at least two ground engaging seeding units. For instance, each metering module 110 can include an independently driven metering roller.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural implement comprising:
    a distribution assembly configured to receive particulate material from a source;
    a plurality of metering modules, each metering module configured to receive a supply of the particulate material from the distribution assembly, each metering module comprising a meter controllable independent of the other metering modules to selectively control a flow of the particulate material to a plurality of lines, including turning the flow on, adjusting a particulate material flow rate, and turning the flow off; and
    a plurality of units configured to inject particulate material into a ground surface, wherein each unit is connected to one of the plurality of lines.

2. The agricultural implement of claim 1, wherein the particulate material comprises at least one of seed and fertilizer, and the plurality of units comprise a plurality of ground-engaging furrow openers.

3. The agricultural implement of claim 1, wherein each metering module of the plurality of metering modules comprises an enclosure configured to hold a quantity of particulate material, the plurality of enclosures being spaced apart along a frame of the agricultural implement.

4. The agricultural implement of claim 1, wherein the plurality of units extend along a width of the agricultural implement that is transverse to a direction of implement travel, and wherein each unit of the plurality of units is spaced a distance from its associated metering module that is less than or equal to thirty percent of the width of the agricultural implement.

5. The agricultural implement of claim 1, wherein each unit of the plurality of units is disposed within 16 feet of the metering module that meters the particulate material to the unit.

6. The agricultural implement of claim 1, wherein particulate material is pneumatically delivered from each metering module to the set of units.

7. The agricultural implement of claim 1, wherein each metering module is configured to control a flow of particulate material to a different set of the units, each set comprising two or more of the units.

8. The agricultural implement of claim 1, wherein each metering module is configured to prevent a flow of particulate material to individual units in the set of units.

9. The agricultural implement of claim 1, wherein the distribution assembly is configured to receive the particulate material from a tank or bin and demand fill each of the plurality of metering modules.

10. The agricultural implement of claim 9, wherein each of the metering modules comprises an enclosure configured to hold a quantity of particulate material, and wherein particulate material flows to the enclosure as a function of space available in the enclosure.

11. The agricultural implement of claim 9, wherein the particulate material is pneumatically delivered from the distribution assembly to each of the metering modules.

12. The agricultural implement of claim 1, wherein each unit receives an entirety of the flow of particulate material in the one of the plurality of lines to which the respective unit is connected.

13. A particulate material distribution assembly comprising:
    a pneumatic demand fill distribution assembly configured to receive particulate material from a supply source and to pneumatically distribute the particulate material to a plurality of metering modules;
    the plurality of metering modules, each metering module configured to receive a portion of the particulate material from the distribution assembly and to independently meter the portion of particulate material to a plurality of tubes, comprising turning a flow of the material on, adjusting a particulate material flow rate, and turning the flow off; and
    a plurality of units configured to inject particulate material into a ground surface, wherein each unit is connected to one of the plurality of tubes.

14. The particulate material distribution assembly of claim 13, the demand fill distribution assembly comprises a plurality of distribution lines, each line distributing particulate material to one of the metering modules.

15. The particulate material distribution assembly of claim 13, wherein the particulate material is pneumatically delivered from the distribution assembly to the metering modules.

16. The particulate material distribution assembly of claim 13, wherein the plurality of metering modules are spaced apart along a frame of an agricultural implement.

17. A method of particulate material distribution comprising:
    distributing particulate material from a source to a plurality of remote locations; and
    selectively metering the particulate material from each remote location to a plurality of seeding units, comprising independently controlling a flow of the particulate material to each of a plurality of sets of the plurality of seeding units, including turning the flow on, adjusting a particulate material flow rate, and turning the flow off.

18. The method of claim 17, wherein metering the particulate material comprises controlling a meter at each of the plurality of remote locations.

19. The method of claim 17, wherein distributing particulate material comprises distributing the particulate material to a plurality of metering modules spaced apart along an agricultural implement.

20. The method of claim 17, wherein metering comprises:
at each remote location,
  receiving a portion of particulate material distributed from the source; and
  controlling distribution of the portion of particulate material to at least two seeding units.

* * * * *